United States Patent
Beale et al.

(10) Patent No.: US 9,465,591 B2
(45) Date of Patent: Oct. 11, 2016

(54) SYNTAX LANGUAGE GENERATOR FOR COMPILER VALIDATION

(71) Applicants: Andrew Ward Beale, Irvine, CA (US); Steven Hurlock, Malvern, PA (US); Patricia Nichols, Irvine, CA (US)

(72) Inventors: Andrew Ward Beale, Irvine, CA (US); Steven Hurlock, Malvern, PA (US); Patricia Nichols, Irvine, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 13/716,284

(22) Filed: Dec. 17, 2012

(65) Prior Publication Data

US 2014/0173552 A1 Jun. 19, 2014

(51) Int. Cl.
G06F 9/45 (2006.01)
G06F 9/44 (2006.01)
G06F 11/36 (2006.01)

(52) U.S. Cl.
CPC . G06F 8/41 (2013.01); G06F 8/37 (2013.01); G06F 8/42 (2013.01); G06F 11/3604 (2013.01)

(58) Field of Classification Search
None
See application file for complete search history.

(56) References Cited

U.S. PATENT DOCUMENTS

| 5,842,205 | A * | 11/1998 | Brann | G06F 9/4425 |
| 6,681,383 | B1 * | 1/2004 | Pastor et al. | 717/126 |
| 7,340,726 | B1 * | 3/2008 | Chelf et al. | 717/126 |
| 8,843,908 | B2 * | 9/2014 | Hawblitzel | G06F 11/3624 717/146 |
| 2005/0010898 | A1 * | 1/2005 | Ogawa | G06F 8/51 717/106 |
| 2006/0101414 | A1 * | 5/2006 | Poole | G06F 9/44589 717/127 |
| 2006/0200806 | A1 * | 9/2006 | Tasinga | G06F 11/3624 717/128 |
| 2008/0275910 | A1 * | 11/2008 | Molina-Moreno | G06F 8/35 |
| 2010/0218173 | A1 * | 8/2010 | Aharoni et al. | 717/143 |
| 2010/0325619 | A1 * | 12/2010 | Song et al. | 717/143 |
| 2011/0078651 | A1 * | 3/2011 | Ovadia et al. | 717/105 |
| 2011/0276945 | A1 * | 11/2011 | Chasman | G06F 11/3604 717/124 |
| 2013/0263091 | A1 * | 10/2013 | Neogi | 717/126 |
| 2014/0040872 | A1 * | 2/2014 | Goetz | G06F 11/3672 717/158 |

OTHER PUBLICATIONS

"Compiler test case generation methods: a survey and assessment", Boujarwah et al., Information and Software Technology 39 (1997) 617-625.*

* cited by examiner

*Primary Examiner* — Daxin Wu
(74) *Attorney, Agent, or Firm* — Robert P. Marley

(57) ABSTRACT

Systems and methods for validating operation of a compiler are disclosed. One method includes receiving a definition of language syntax at an automated source code generator, and generating program code at the automated source code generator, the program code represented in source code including constructed self-validating code and syntactically-correct automatically generated code. The method also includes providing the source code to the compiler to be compiled into object code. Based on execution of the self-validating code as object code in a computing system, a computing system executing the object code outputs an indication of the correctness of compilation of the program code.

20 Claims, 7 Drawing Sheets

SYNTAX LANGUAGE GENERATOR FOR COMPILER VALIDATION

TECHNICAL FIELD

The present application relates generally to validation methodologies to determine that a language compiler operates correctly. In particular the present application relates to a syntax language generator for compiler validation.

BACKGROUND

Compilers are large, complex software programs typically constructed to translate software code written in a first language into code written in a different language. Typically, compilers are used to translate code written in a high-level language, such as C, C++, JAVA ALGOL, or some other type of high level object-oriented language into a lower level language, such as machine language, for execution on a particular computing system having a known instruction set architecture.

Translation accuracy is a critical feature of any compiler, since even slight differences in the compiler's treatment of syntax my have a drastic effect on the overall output of the compiler. Furthermore, differences may exist in compiler versions that would result in differences in resulting object code that is to be executed, even when receiving the same source code. This is to be expected; however, it is understood that if the compiler executes properly, the overall effect of the resulting object code will be the same regardless of the compiler version used.

In view of the differences in compiler output that are expected in different compiler versions, it can be difficult to validate proper output of a compiler. Furthermore, compilers generally include a large number of different types of procedures, and it can be difficult to ensure that each compiler procedure has been fully validated if a user were forced to write test code targeting each compiler procedure. Even if this were feasible, there may be cases where interrelationships between instructions cause an unforeseen compilation issue due to the way syntax of particular instructions is parsed, and which therefore would not be detected by manually-developed compiler tests.

Many of these issues are avoided when compiler code changes relatively slowly, for example where there is little change to a compiler's expected output over time. However, in cases where a compiler has undergone heavy revision (e.g., over about 10-30% of the compiler code being re-written or revised), substantial validation of all or most of the compiler's operation is required.

In addition, when a compiler's code base has changed to a great extent, it may also be due to changes in an execution architecture of an associated microprocessor or execution engine that is the target of that compiler. In such cases, it may be difficult to detect exactly where the source of error occurs between the compiler and the associated microprocessor or execution engine.

For these and other reasons, improvements are desirable.

SUMMARY

In accordance with the following disclosure, the above and other issues are addressed by the following:

In a first aspect, a method for validating operation of a compiler is disclosed. The method includes receiving a definition of language syntax at an automated source code generator, and generating program code at the automated source code generator, the program code represented in source code including constructed self-validating code and syntactically-correct automatically generated code. The method also includes providing the source code to the compiler to be compiled into object code. Based on execution of the self-validating code as object code in a computing system, a computing system executing the object code outputs an indication of the correctness of compilation of the program code.

In a second aspect, a system for testing operation of a compiler is disclosed. The system includes an automated source code generator configured to receive a definition of language syntax and automatically output source code, the source code including constructed self-validating code and syntactically-correct automatically generated code, the source code to be provided to the compiler. The source code is constructed such that the syntactically-correct automatically generated code implicates one or more procedures in a compiler and the constructed self-validating code causes, upon execution of compiled code based on the source code, a comparison between an expected outcome and an actual outcome, thereby validating a correct parsing of syntax and generation and execution of the compiled code.

In a third aspect, a computer-readable storage medium is disclosed that includes computer-executable instructions which, when executed, cause a computing system to perform a method of validating operation of a compiler. The method includes receiving a definition of language syntax at an automated source code generator, and generating program code at the automated source code generator, the program code represented in source code including constructed self-validating code and syntactically-correct automatically generated code. The method further includes providing the source code to the compiler to be compiled into object code. Based on execution of the self-validating code as object code in a computing system, the computing system executing the object code outputs an indication of the correctness of the compiler in parsing the language syntax of the source code and in generating and executing instructions corresponding to the source code.

DETAILED DESCRIPTION

Figure 1:
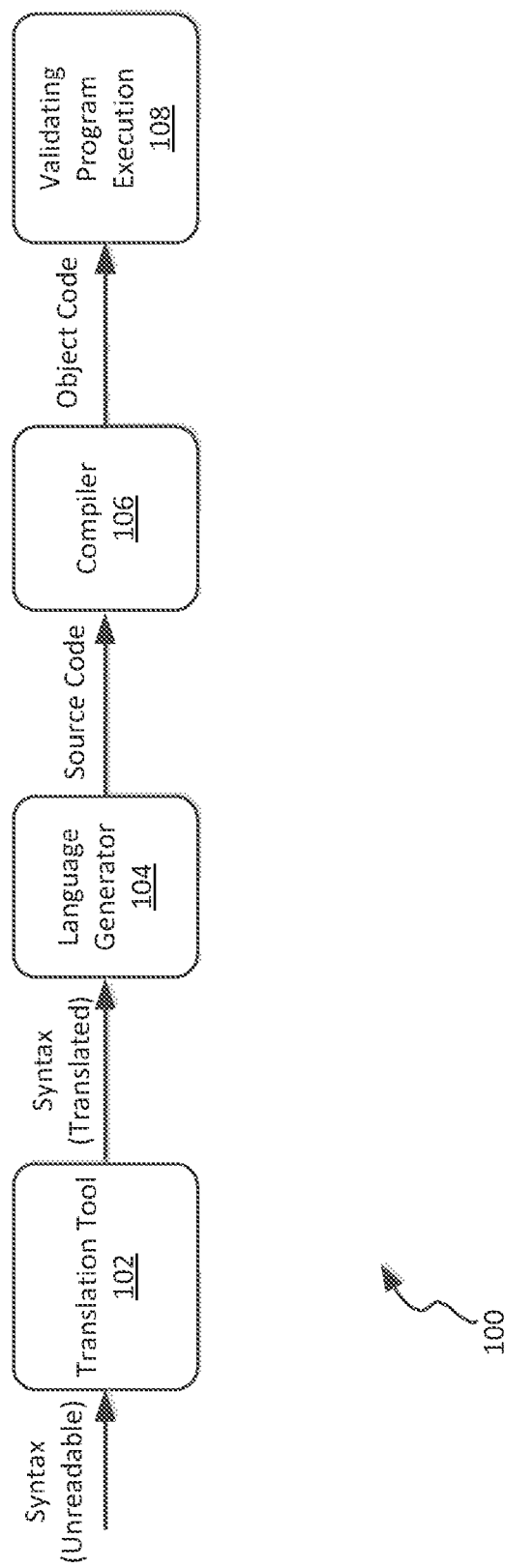
FIG. 1 is a schematic view of a system for testing operation of a compiler, according to an example embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for generating language that can be used to validate correctness of operation of a compiler. In particular, the present disclosure relates to a source code generator useable to validate a compiler configured to be used in connection with a particular target language, for example to validate proper treatment of syntax by the compiler, or other operational characteristics of the compiler. As used, such a source code generator can be used on a repeated basis to validate correct operation of the compiler by comparing expected and actual outcomes of parsing various syntactical features that are to be recognized and handled by the compiler, simplifying overall compiler validation. This is particularly useful in cases where there is a large modification to overall syntax expected by a compiler, for example when an instruction set is modified (e.g., by way of an extension to an instruction set or other occurrence).

Referring now to FIG. 1, a schematic view of a system 100 for testing operation of a compiler is disclosed according to an example embodiment. The system 100 as illustrated represents an overall construct for testing the way in which a compiler parses syntax, for example by generating source code that includes self-validating code, as well as randomly generated code that is syntactically correct, such that the source code can successfully compile.

In the embodiment shown, the system 100 includes a translation tool 102 that receives an initial syntax description, and translates that initial syntax description into a format readable by a language generator 104. The translation tool 102 can take many forms, and cause this translation many ways depending upon the received input format and the desired output format of the syntax description. For example, the translation tool 102 can receive a user-readable syntax description, for example in a text document, and translate that document into a machine-recognizable and machine-parsable set of syntax definitions. In some embodiments, the translation tool 102 can perform a transformation such as is illustrated in connection with FIG. 2, below.

It is noted that the syntax description, as referred to herein, generally corresponds to a user-readable or system-readable structural definition of formats in which source code instructions can be recognized and compiled. For example, a syntax description can include a definition of the placement and usage of various punctuation, symbols (e.g., arithmetic operators, etc.) and specific source code commands that would indicate the presence of a function, procedure, pointer, or other programmatic construct that would need to be recognized by the compiler.

In the embodiment shown, the language generator 104 is generally configured to receive a computer-readable and computer-parsable syntax description, and use that syntax description to, at least somewhat "intelligently" create source code to be provided to a compiler 106. In particular, the language generator 104 is configured to generate a self-validating program that includes one or more automatically generated source code statements written using valid syntax, as defined by the syntax description. The language generator can do this in a variety of number of ways. For example, in example embodiments discussed in further detail below, the language generator 104 can be configured to output a combination of constructed, self-validating code, as well as syntactically-correct generated code, useable to test and exercise the syntax parsing capabilities and correct compilation characteristics of the compiler 106. As further discussed below, the self-validating code can be used to determine if object code is correctly generated by a compiler in response to receipt of source code. This can include, for example, determining that language syntax is parsed properly, and can be accomplished, for example by placing comparisons between expected and actual output of a particular type of code construct (e.g., a case statement, loop, or arithmetic expression) in code that otherwise includes a series of automatically generated syntactically correct code. It is noted that if the self-validations are executed successfully, it can be assumed that the automatically generated source code was parsed and compiled properly, because it did not cause incorrect operation of the ultimately compiled code. It is noted that, because the code executes successfully, this also provides validation of the system on which the code executes, since an error in execution can be caused either by the compiler or the system on which the compiled code executes.

In the embodiment shown, the compiler 106 generally corresponds to a compiler useable to translate source code, such as code provided at a machine code level or otherwise in a known language, into object code that is executable on a target computing system. In an example embodiment, the compiler 106 corresponds to an MCP compiler available from Unisys Corporation of Blue Bell, Pa. However, it is recognized that other types of compilers could be used as well.

As illustrated in FIG. 1, the output from the compiler 106, based on the received source code, corresponds to object code forming a self-validating executable program 108. In general, the self-validating code executes in a manner reflective of the source code provided to the compiler. In other words, the self-executing code will generally include a setting defining an expected value, as well as a method of tracking an actual value through execution of the code, such as counting a number of times a loop is traversed, storing an expected sum of a set of arithmetic instructions, or setting constants based on the particular portion of a case statement reached. Within, before, or after each of those constructs, a number of other automatically generated statements can be included which, based on the fact that they are generated from the syntax definition received by the language generator 104 will generally represent a variety of possible syntactically valid (although programmatically perhaps nonsensical) instructions. As such, various portions of the compiler 106 will be called based on the various automatically-generated code, since the language generator 104 is constructed to generate valid source code instructions using each of the definitions included in the syntax description in various orders and combinations. Additional discussion of example self-validating code is provided below, in connection with FIGS. 4-6.

It is noted that, if an error occurs in the self-validating code generated by the language generator 104, it is possible that the error occurs in the compiler 106, or alternatively that the error exists in the execution of the code itself, for example due to an error in the execution engine (e.g., the microprocessor, programmable circuit, or other associated execution unit, such as a virtual processor operating thereon). In such circumstances, correct operation of the program 108 indicates correct parsing of language syntax, as well as correct generation of code by the compiler 106 and execution of the program 108.

Figure 2:
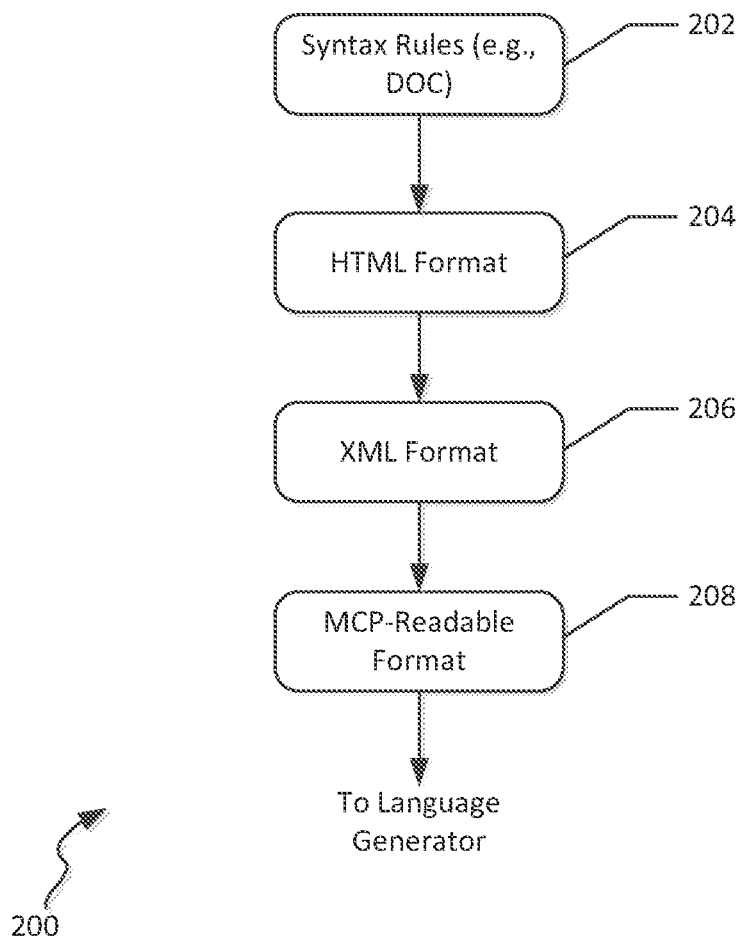
FIG. 2 is a data flow of conversion of a language syntax description, according to an example embodiment.

Referring now to FIG. 2, a data flow diagram 200 illustrating conversion of a language syntax description into a format readable by a language generator, such as language generator 104, is shown, according to an example embodiment. The data flow diagram 200 generally represents a specific method of converting a user-readable syntax description into a definition of syntax that is capable of being parsed to automatically generate source code.

In the embodiment shown, the data flow diagram is illustrated as starting with a user-readable version 202 of a syntax description. In an example embodiment, this user-readable version 202 of the syntax description can be, for example, stored in a WORD formatted document, or other document format capable of convenient access and use by a human. For example, in a particular embodiment, the syntax description is represented in a WORD document, and describes syntax for an ALGOL programming language in the context of railroad diagrams, which graphically depict a structure for each type of operator or symbol expected to be encountered in the ALGOL programming language. In some such embodiments, the user-readable version 202 of the syntax description corresponds to the documentation typically distributed in association with a compiler or computing system to illustrate to developers of software for that platform how source code should be written to comply with compiler and language constructs. As such, the user-readable version 202 of the document can be assumed to be accurate, since it corresponds directly to the instructions provided for property programming using the compiler 106.

In the embodiment shown, the user-readable version 202 can be converted to a markup language format, shown as HTML format file 204. The HTML format file 206 can be used because, in some embodiments, syntax definitions in the text version 202 are recognizable in that the syntax definitions are included in italics or some other font-specific designation; similarly, when converted into a webpage via any of a variety of HTML conversion tools, the different in textual appearance can be represented by tags surrounding that differently-appearing text. In such embodiments, the HTML format file 204 can be in turn translated to an XML format file 206, and then the tags and non-definitional (e.g., descriptive) data within the original text file can be discarded, This provides an XML file 206 including a number of statements representing valid formats of language syntax expected by the compiler. Additional boilerplate headers or other information required by the language generator 104 to recognize the file as a syntax description can be added, and subsequently the entire file can be re-converted into a file that is recognizable by the language generator 104. In the embodiment shown, that file is referred to as an MCP-readable file 208, for example using characters, data types, and descriptions recognizable and useable on an MCP-type system from Unisys Corporation of Blue Bell, Pa.

Figure 3:
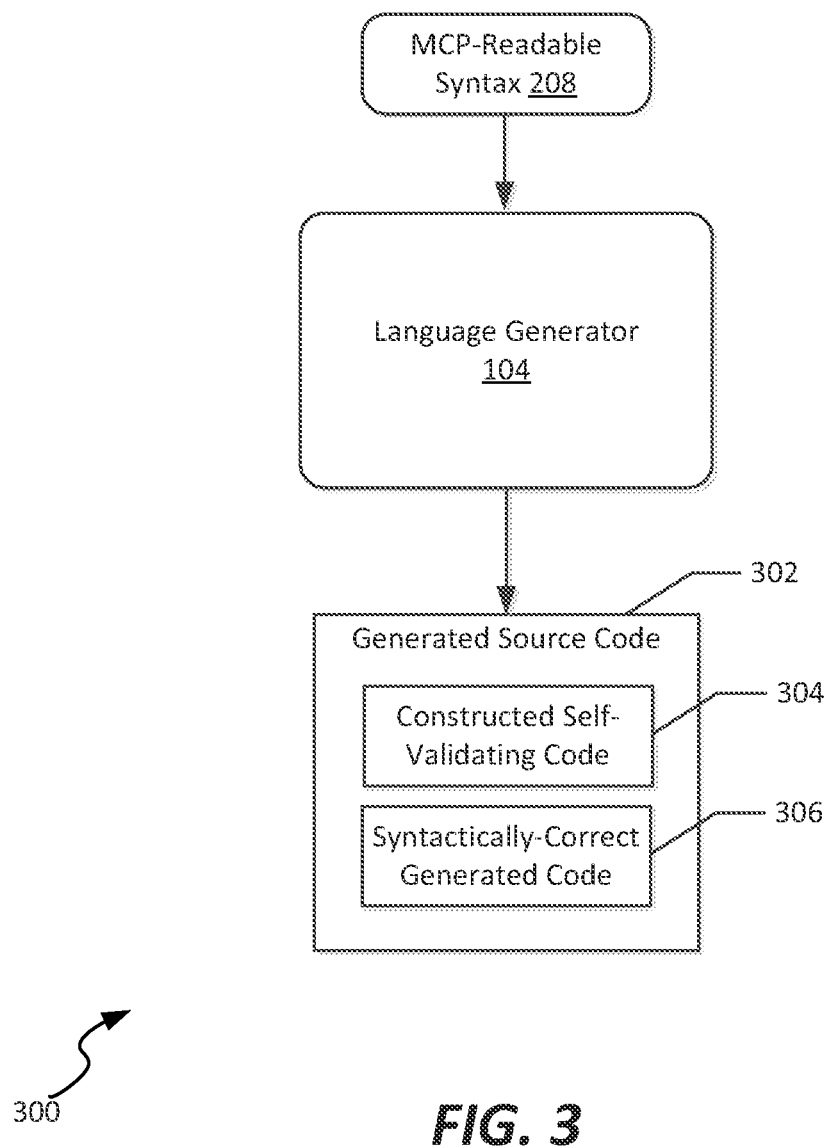
FIG. 3 is a block diagram illustrating generation of source code by an automated source code generator, according to an example embodiment.

Referring now to FIG. 3, a block diagram illustrating a system 300 for generating source code by an automated source code generator 104 is shown, according to an example embodiment. The system 300 can be, for example, a sub-portion of the overall system 100 of FIG. 1, and in particular a portion of the system responsible for generating source code to be provided to the compiler 106.

As illustrated in FIG. 3, a system-readable format file, such as an MCP-readable format file 208, is received by a language generator 104. The language generator then uses that file 208, and the machine readable description of the syntax used in source code within it, to form source code to be output for compilation. In the embodiment shown, the language generator 104 is configured to generate source code 302 that includes constructed, self-validating code 304, as well as syntactically correct, generated code 306.

The self-validating code 304 is generally the portion of the source code 302 that, when compiled, will perform a particular testing function to validate correct performance of the compiler 106 relative to parsing syntax of received source code. The generated code 306 is included in connection with the self-validating code 304, and is used to randomly test various portions of the compiler. In general, because the generated code 306 is automatically generated by the language generator 104 according to the syntax description provided in the file 208, various portions of the compiler will be exercised in creating object code. As such, by initiating and resolving tests in the self-validating code, and in the interim executing instructions included via the generated code 306, various portions of the compiler can be tested.

Referring specifically to the source code 302 described, there are a number of examples of possible self-validating code that can be used. In a first example, the self-validating code 304 can include a "case" statement, in which a randomly-chosen variable is assessed, and based on the value of that variable, a particular path through source code is taken. An expected value of the variable can be stored (i.e., the randomly selected variable), and then a separate variable can be included within each particular case statement as the actual value of that case statement. At the end of the case statement, the actual value and expected value can be compared, to determine that the case statement is traversed successfully. If there is a mismatch between these values, it can be assumed that at least some feature within the compiler mis-parsed the source code in the case statement, and therefore there is a likely issue with the way the compiler parsed the syntax of the source code received. For example, this failure could be due to recognizing a number as a character or vice versa, mis-assigning a particular operator symbol as a character or as a different operator, or some other arrangement that would cause actual and expected values to become unequal.

In a second example, the self-validating code 304 can include a loop construct, such as a "for" loop, or a "do-while" loop, in which a loop counter increments each time a loop is traversed. The loop counter can, in such embodiments, be the randomly-generated value, and can be aggregated each time through the loop and compared to a known ending value to determine whether the loop was traversed an appropriate number of times. Again, by placing some amount of randomly or automatically generated, but syntactically correct, code within the loop, the loop construct can be tested, as well as various other syntax that would be included in that generated code.

In a third possible example, the self-validating code 304 can include arithmetic operations. For example, the self-validating code can include a series of arithmetic operations having interspersed therein a number of other generated source code statements. As with the previous examples, a running sum, or other mechanism, can be compared to an expected result from the arithmetic operations to determine if those and intervening source code instructions are parsed properly.

It is further noted that the source code 302 can be structured such that one or more of these types of combinations of self-validating code 304 and syntactically correct, generated code 306, can be included in a particular set of source code to be compiled. Furthermore, various combinations of self-validating code 304 and generated code 306 can be nested, such that various sub-portions of the source code can include different comparisons between expected and actual values. A failure of one such comparison but not others would assist in isolating a problem to a particular sub-portion of the source code, thereby assisting in isolating issues that may have occurred in the compiler when the code is ultimately compiled and executed.

In still further embodiments, the source code generated by the language generator can include additional variables that allow for tracking information about nested procedure depth, flags indicating that bounded values are required in the code, or other features could be included in the self-validating code 304, for use in connection with the syntactically valid generated code 306 to create source code that results in self-validating programs when compiled.

Figure 4:
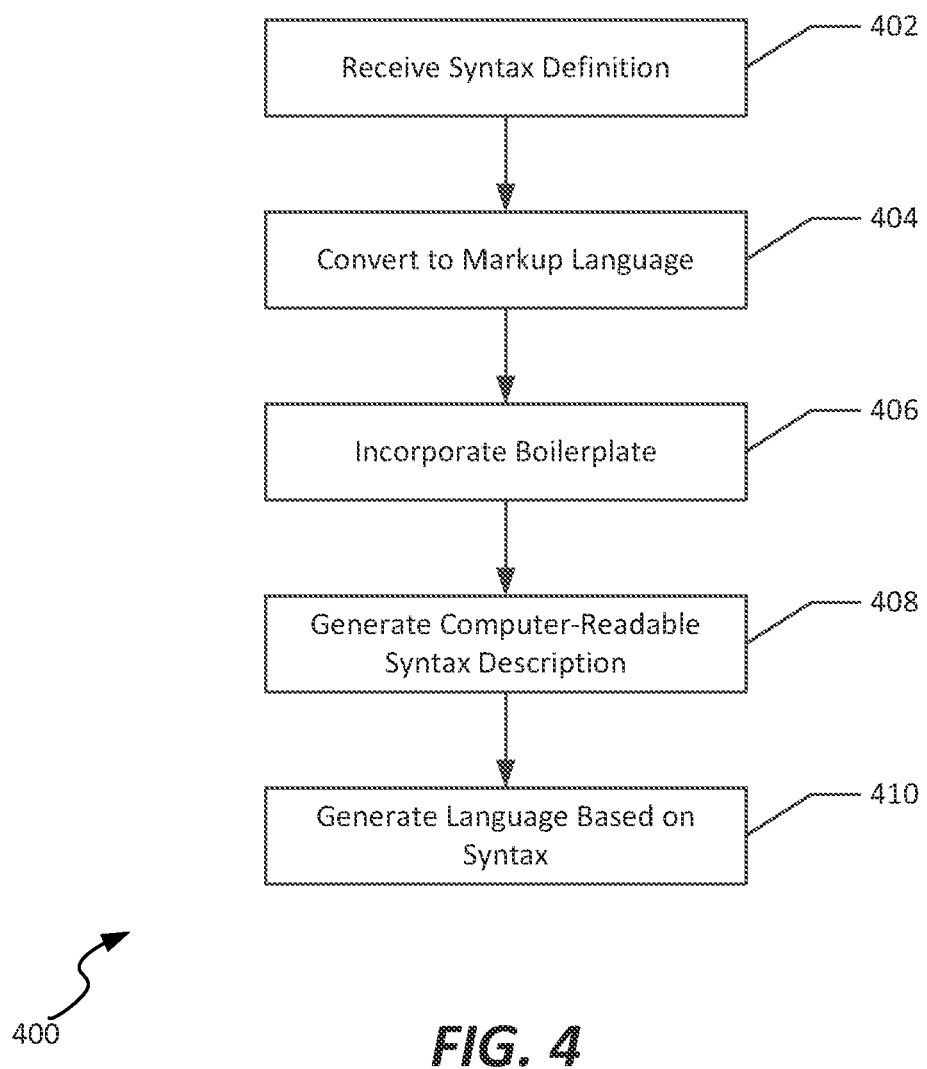
FIG. 4 is a flowchart of a method of formatting syntax files and generating source code useable to test operation of a compiler, according to an example embodiment.

Referring now to FIG. 4, a flowchart of a method 400 of formatting syntax files and generating source code useable to test operation of a compiler is disclosed, according to an example embodiment. The method 400 can be performed, for example, by a user of a language generator, such as language generator 104 of FIGS. 1 and 3, to create source code useable to test treatment of language syntax in a compiler without requiring a user to write that source code him/herself.

In the embodiment shown, the method 400 includes receiving a syntax definition, for example in the form of railroad diagrams in a WORD document that describe the ALGOL programming language (or some other programming language), as noted in connection with FIG. 2 (step 402). Such a construct could appear, for example, as follows:

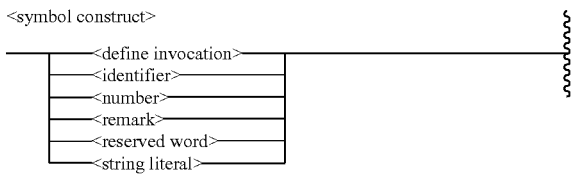

That syntax definition, which can be in the form of a user-readable file 202, is then converted to a markup language, such as HTML and/or XML (step 404). This can include, for example, converting the document representing the user-readable version 202 as a webpage using known tools that recognized text and/or data formats (e.g., italics, bold, or other textual differences) to form an HTML-based file. In some such embodiments, the HTML file can be further processed by recognizing tags surrounding the ladder diagrams (e.g., due to their being in a different font or font style (e.g., italics) than other portions of the user-readable syntax description file 202.

In the embodiment shown, the method 400 further includes inclusion of one or more boilerplate statements (step 406). This can be done, for example to provide additional definitions on a one-off basis, or to tweak specific syntax for use of a specific language with a particular compiler version. Once any boilerplate declarations that are required have been added to the XML or other markup language syntax description file (e.g., file 206 of FIG. 2) can be parsed by a scripting program (e.g., in Powershell or equivalent scripting program) to form a computer-readable version of the syntax description, such as syntax description file 208 (step 408).

After a computer-recognizable syntax description file 208 is created, that file can be provided to a language generator, such as language generator 104. The language generator 104 can in turn generate one or more different source code programs that include entirely syntactically valid programs based on the syntax descriptions in the file 208, and including both self-validating code 304 and syntactically correct, generated code 306, which together can be compiled and executed to provide a pass/fail verification of particular programmatic constructs.

Figure 5:
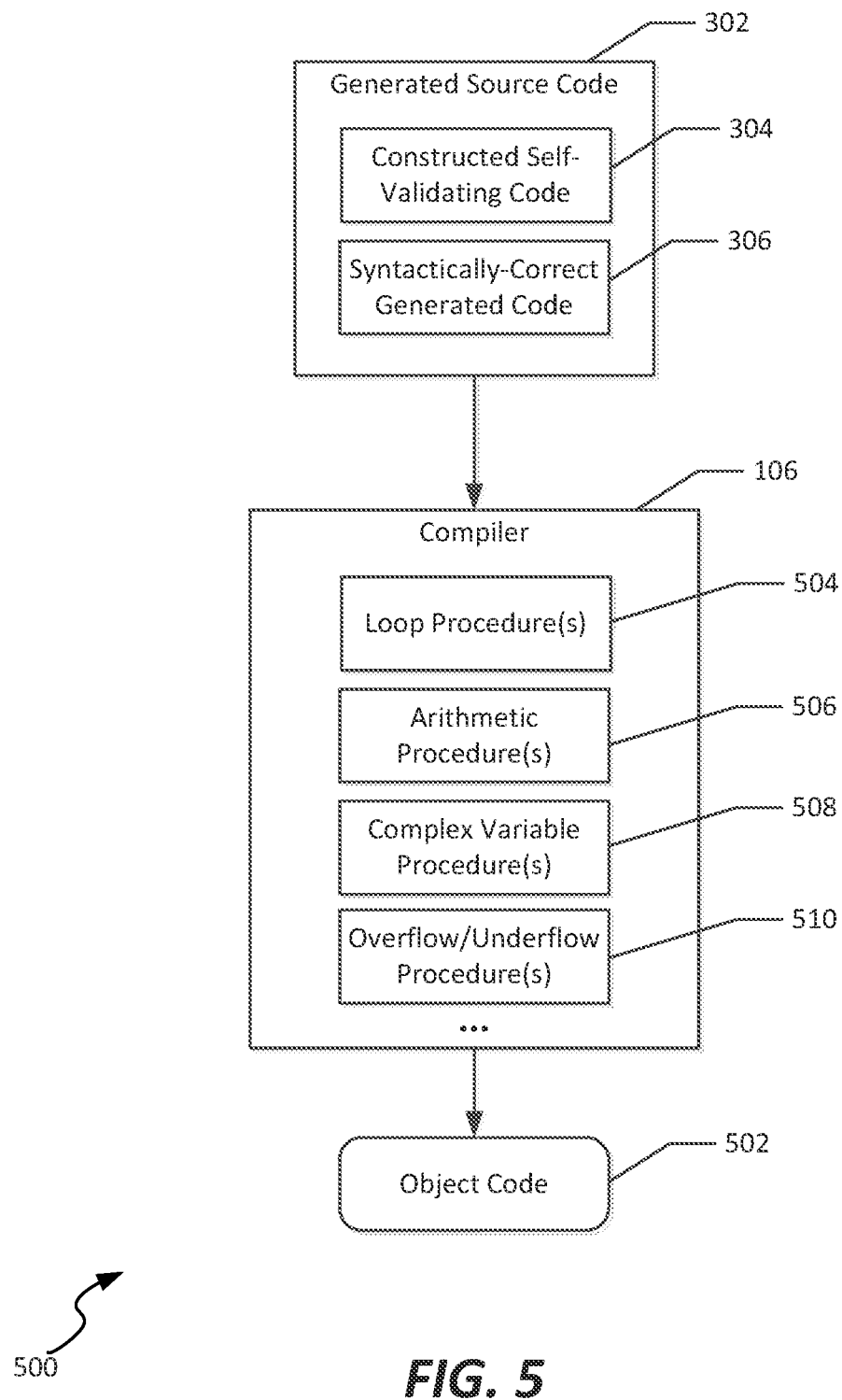
FIG. 5 is a block diagram illustrating compilation of source code by a compiler to be tested, according to an example embodiment.

Referring now to FIG. 5 a block diagram 500 illustrates compilation of source code 302 by a compiler 106 to be tested, according to an example embodiment. As illustrated in diagram 500, the source code 302, including self-validating code 304 and syntactically correct, generated code 306, are provided to the compiler 106, which will proceed to compile that source code to generate an executable object file 502. The object file 502 generally represents an executable version of source code 302, which can be executed to generate the pass/fail determinations discussed above as indicating that the compiler properly parses the source code 302.

As illustrated in FIG. 5, the compiler 106 is illustrated as including a variety of procedures that may be called during compilation of source code 302, depending upon the particular source code (and syntax) encountered. In the embodiment shown, example procedures include loop procedures 504, arithmetic procedures 506, complex variable handling procedures 508, and overflow/underflow procedures 510. Other procedures could be included in the compiler as well. Depending upon the source code received, one or more if these constructs could be tested, for example by using a randomly-set variable tracked through such an event (e.g., a loop, arithmetic, or data type conversion), and compared. This allows the compiled program to determine whether an expected outcome in fact is equal to the actual value of the same variable.

Figure 6:
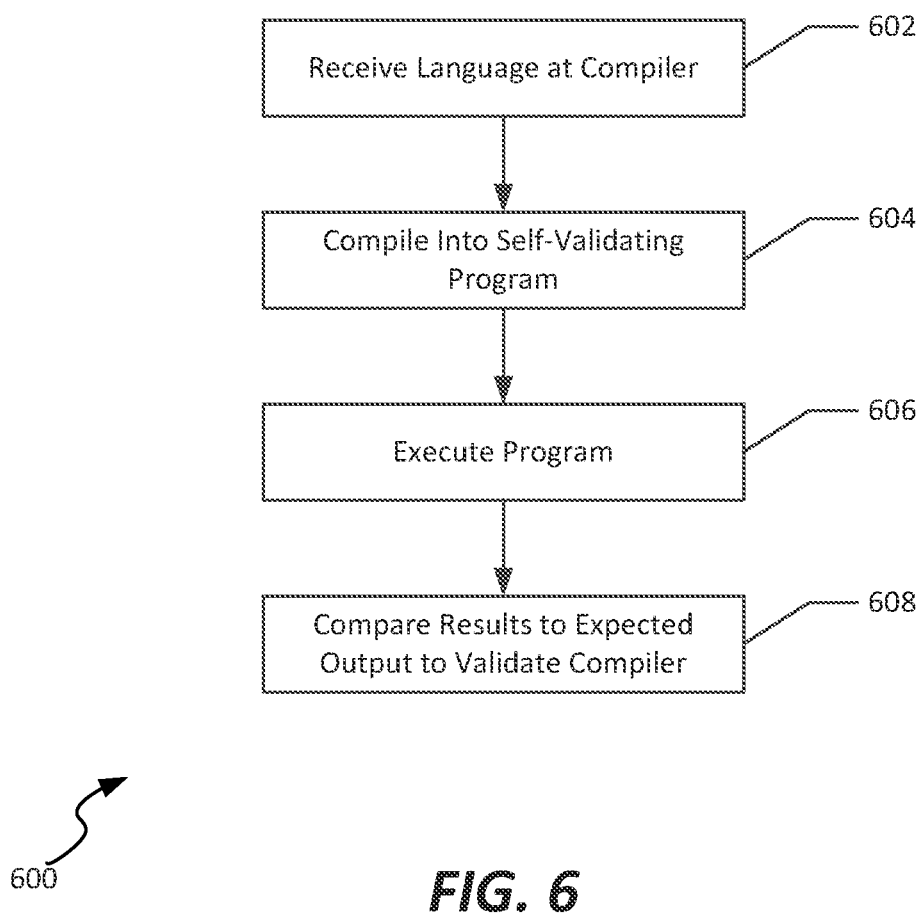
FIG. 6 is a flowchart of a method of testing a compiler using source code created by an automated source code generator, according to an example embodiment.

Referring now to FIG. 6, a flowchart of an example method 600 for testing a compiler using source code created by an automated source code generator, such as the language generator 104 described herein. The method 600 includes receiving source code 302 at the compiler 106 (step 602), and compiling that source code 302 into a self-validating, executable program (step 604). The method 600 further includes executing the self-validating executable program (step 606), which results in output of one or more pass/fail determinations based on a comparison of expected and actual values of a particular variable (step 608).

Referring to FIG. 6 overall, it is noted that the method 600 can be performed one or more times using different source code to validate treatment of syntax in the compiler 106 in various scenarios. This is because each use of the language generator 104, described above, will result in creation of a new and different set of source code with which the compiler 106 can be tested. Furthermore, it is noted that, in some embodiments, the language generator 104 can be configured to test one type of construct at a time (e.g., a case statement, loop, etc.) while randomly generated code within that construct can be used to test the syntax parsing of the compiler as part of that construct. In alternative embodiments, more than one such type of construct could be included in the same program. It is noted that, in different operations of the language generator 104, even when the same program constructs are used, different source code will be generated, since the generated code 306 is randomly generated by the language generator rather than pre-programmed. As such, multiple iterations of generated source code 302 will result in different source code and therefore different execution results when compiled. Accordingly, repeated source code generation, compilation, and execution can provide increasing levels of confidence that the compiler properly parses expected syntax of a particular programming language, without requiring a user to manually code different test cases for use in the compiler.

It is further noted that, using the language generator 104 of the present disclosure, many iterations of the same type of program construct (e.g., a case statement, loop, etc.) can be executed and tracked. If actual and expected values are repeatedly determined equal, this provides reasonable assurance that those portions of the compiler properly parse syntax of source code, and would execute properly. However, in the event of a failed comparison in the self-validating object code when executed, it can be difficult to pinpoint the location in the compiler that caused the specific error observed. Accordingly, in some embodiments, it is noted that the compiler 106 can be an instrumented compiler, such that the compiler can indicate the specific procedures that are used to compile source code; in such embodiments, the combination of output of such an instrumented compiler and the pass/fail determination of the self-validating program in object code 502 can be used to pinpoint the specific portions of the compiler code that caused the faulty parsing of source code syntax.

In still further example applications, it is noted that example output source code from the language generator can be compiled and executed on different execution units, thereby validating operation of those execution units alongside the validation of syntax parsing and code generation by the compiler. By isolating one or both of the compiler and an execution unit (e.g., by using a known-good compiler or execution unit as the other component), it is possible to further determine the source of possible errors in execution.

Figure 7:
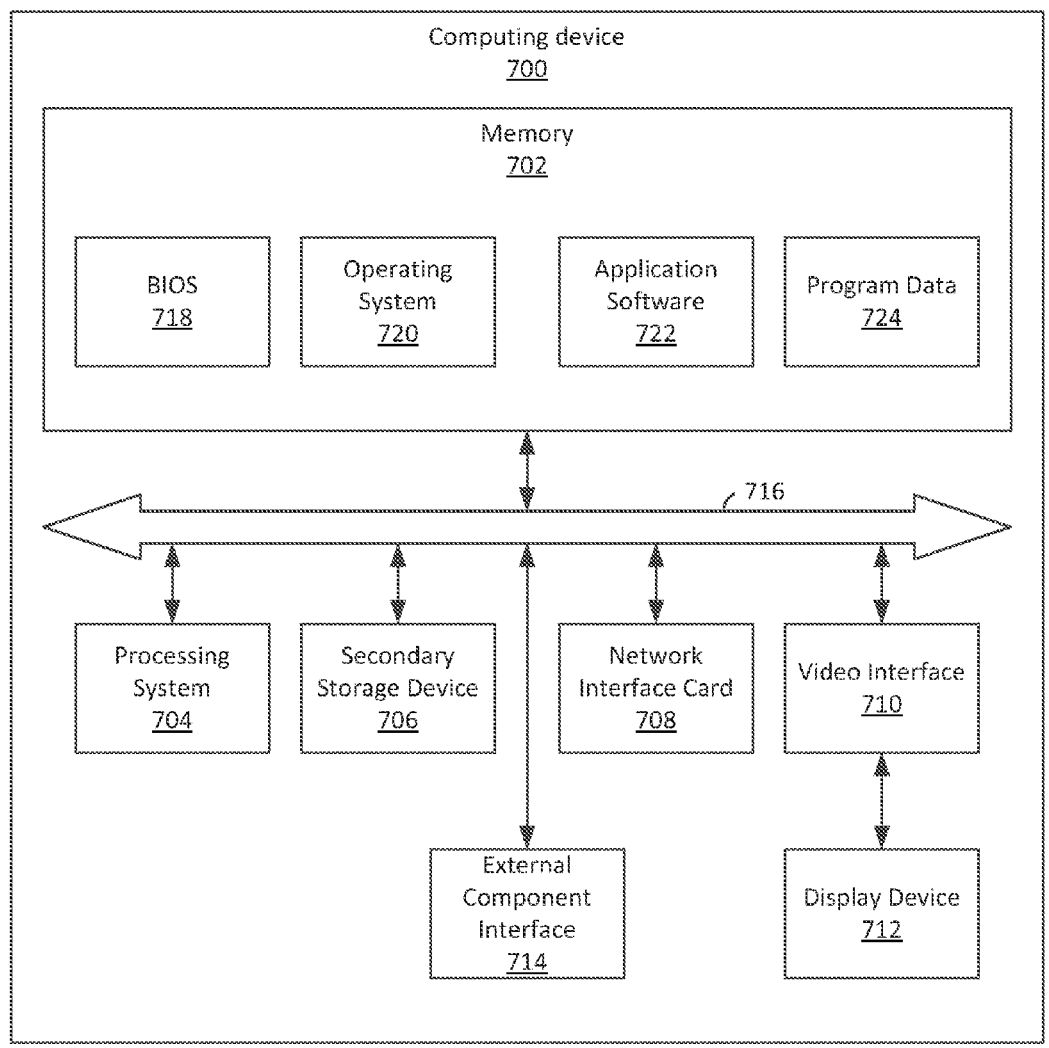
FIG. 7 illustrates an example electronic computing device in which aspects of the present disclosure can be implemented.

Referring now to FIG. 7, a block diagram illustrating an example computing device 700 is shown, which can be used to implement aspects of the present disclosure. In particular, the computing device 700 can represent a native computing device, such as a computing system on which any of a variety of the systems of FIGS. 1-6 can be implemented.

In the example of FIG. 7, the computing device 700 includes a memory 702, a processing system 704, a secondary storage device 706, a network interface card 708, a video interface 710, a display unit 712, an external component interface 714, and a communication medium 716. The memory 702 includes one or more computer storage media capable of storing data and/or instructions. In different embodiments, the memory 702 is implemented in different ways. For example, the memory 702 can be implemented using various types of computer storage media.

The processing system 704 includes one or more processing units. A processing unit is a physical device or article of manufacture comprising one or more integrated circuits that selectively execute software instructions. In various embodiments, the processing system 704 is implemented in various ways. For example, the processing system 704 can be implemented as one or more processing cores. In another example, the processing system 704 can include one or more separate microprocessors. In yet another example embodiment, the processing system 704 can include an application-specific integrated circuit (ASIC) that provides specific functionality. In yet another example, the processing system 704 provides specific functionality by using an ASIC and by executing computer-executable instructions.

The secondary storage device 706 includes one or more computer storage media. The secondary storage device 706 stores data and software instructions not directly accessible by the processing system 704. In other words, the processing system 704 performs an I/O operation to retrieve data and/or software instructions from the secondary storage device 706. In various embodiments, the secondary storage device 706 includes various types of computer storage media. For example, the secondary storage device 706 can include one or more magnetic disks, magnetic tape drives, optical discs, solid state memory devices, and/or other types of computer storage media.

The network interface card 708 enables the computing device 700 to send data to and receive data from a communication network. In different embodiments, the network interface card 708 is implemented in different ways. For example, the network interface card 708 can be implemented as an Ethernet interface, a token-ring network interface, a fiber optic network interface, a wireless network interface (e.g., Wi-Fi, WiMax, etc.), or another type of network interface.

The video interface 710 enables the computing device 700 to output video information to the display unit 712. The display unit 712 can be various types of devices for displaying video information, such as a cathode-ray tube display, an LCD display panel, a plasma screen display panel, a touch-sensitive display panel, an LED screen, or a projector. The video interface 710 can communicate with the display unit 712 in various ways, such as via a Universal Serial Bus (USB) connector, a VGA connector, a digital visual interface (DVI) connector, an S-Video connector, a High-Definition Multimedia interface (HDMI) interface, or a DisplayPort connector.

The external component interface 714 enables the computing device 700 to communicate with external devices. For example, the external component interface 714 can be a USB interface, a FireWire interface, a serial port interface, a parallel port interface, a PS/2 interface, and/or another type of interface that enables the computing device 700 to communicate with external devices. In various embodiments, the external component interface 714 enables the computing device 700 to communicate with various external components, such as external storage devices, input devices, speakers, modems, media player docks, other computing devices, scanners, digital cameras, and fingerprint readers.

The communications medium 716 facilitates communication among the hardware components of the computing device 700. In the example of FIG. 7, the communications medium 716 facilitates communication among the memory 702, the processing system 704, the secondary storage device 706, the network interface card 708, the video interface 710, and the external component interface 714. The communications medium 716 can be implemented in various ways. For example, the communications medium 716 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 6, the memory 702 stores a Basic Input/Output System (BIOS) 718 and an operating system 720. The BIOS 718 includes a set of computer-executable instructions that, when executed by the processing system 704, cause the computing device 700 to boot up. The operating system 720 includes a set of computer-executable instructions that, when executed by the processing system 704, cause the computing device 700 to provide an operating system that coordinates the activities and sharing of resources of the computing device 700. Furthermore, the memory 702 stores application software 722. The application software 722 includes computer-executable instructions, that when executed by the processing system 704, cause the computing device 700 to provide one or more applications. The memory 702 also stores program data 724. The program data 724 is data used by programs that execute on the computing device 700.

Although particular features are discussed herein as included within an electronic computing device 700, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data on a tangible medium. As such, computer storage media, as the term is used herein, are not generally constructed exclusively from transitory wired or wireless signals, but rather include some type of tangible storage medium. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Referring to FIGS. 1-7 generally, it is noted that the language generator and compiler validation procedures discussed herein provide a simplified mechanism by which a developer can validate a compiler in instances where large portions of the compiler have changed and require validation. Because different compiler versions will likely output object code having different sequences of instructions but that have the same effect, a direct object code-to-object code comparison is ineffective at determining errors; rather, the self-validating programs as discussed herein provide a mechanism by which specific cases can be validated. Furthermore, the fact that these source code programs can be rapidly and repeatedly generated to different compilation effects allows for testing of many cases that would otherwise require painstaking effort on behalf of one or more individuals tasked with compiler validation.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of validating operation of a compiler, the method comprising:
    receiving, by a translation tool, a user-readable syntax description in a text document;
    translating, by the translation tool, the user-readable syntax description in the text document into a definition of language syntax;
    receiving the definition of language syntax at an automated source code generator from the translation tool;
    generating program code at the automated source code generator based on the received definition of language syntax, wherein the program code is represented in source code including constructed self-validating code and syntactically-correct automatically generated code, wherein the constructed self-validating code is programmed to test for validation of correct performance of the compiler relative to parsing syntax of the received definition of language syntax when the constructed self-validating code is compiled by the compiler; and
    providing the source code to the compiler;
    compiling, by the compiler, the source code into object code;
    executing the self-validating code as the object code in a computing system such that the computing system outputs an indication of correctness of compilation of the program code by the compiler in response to receipt of the source code; and
    executing the syntactically-correct automatically generated code as the object code in the computing system and testing at least an operation of the compiler.

2. The method of claim 1, wherein the syntactically-correct automatically generated code comprises randomly generated language statements defined at least in part by the definition of language syntax.

3. The method of claim 1, wherein at least one of:
    (a) the portion of the compiler is tested randomly, or
    (b) the executing of the self-validating code and the executing of the syntactically-correct automatically generated code is concurrent.

4. The method of claim 1, wherein the self-validating code includes code providing a comparison between expected outcome in the event of proper parsing of a program structure and an actual outcome based on compilation of the program structure in the compiler.

5. The method of claim 4, wherein the program structure is selected from a group of program structures consisting of:
    a loop program structure;
    an arithmetic program structure; and
    a case statement.

6. The method of claim 1, wherein the self-validating code includes a plurality of comparisons between expected outcomes based on proper parsing of the program structure and actual outcomes based on compilation of the program structure in the compiler.

7. The method of claim 1, wherein the source code is constructed to require compilation via one or more of a plurality of compiler procedures.

8. The method of claim 7, wherein the compiler procedures are selected from a group consisting of:
loop handling procedures;
overflow/underflow procedures;
arithmetic procedures; and
complex variable procedures.

9. The method of claim 7, further comprising generating second program code at the automated source code generator, the second program code represented in second source code including second constructed self-validating code and second syntactically-correct automatically generated code, the second syntactically-correct automatically generated code including a plurality of code statements that are defined by the definition of language syntax but are different from those in the program code.

10. The method of claim 9, whereby the second source code, when compiled in a compiler, tests one or more different compiler procedures from those tested by the source code.

11. The method of claim 10, wherein the compiler procedures tested are based at least in part on the syntactically-correct automatically generated code and the second syntactically-correct automatically generated code.

12. A system, comprising a hardware processor, for testing operation of a compiler, the system comprising:
a translation tool configured to receive a user-readable syntax description in a text document and to translate the user-readable syntax description in the text document into a definition of language syntax;
an automated source code generator module executable on a computing system to receive the definition of language syntax from the translation tool and to automatically output source code based on the received definition of language syntax, wherein the source code including constructed self-validating code and syntactically-correct automatically generated code, wherein the source code is configured to be provided to a compiler, wherein the constructed self-validating code is programmed to test for validation of correct performance of the compiler relative to parsing syntax of the received definition of language syntax when the constructed self-validating code is compiled by the compiler;
wherein the source code is constructed such that the syntactically-correct automatically generated code implicates one or more procedures in the compiler, thereby testing at least a portion of the compiler, and the constructed self-validating code causes, upon execution of compiled code based on the source code, a comparison between an expected outcome and an actual outcome, thereby validating a correct parsing of language syntax and generation and execution of the compiled code.

13. The system of claim 12, wherein the portion of the compiler is tested randomly.

14. The system of claim 12, further comprising an executable program output by the compiler and including the compiled code, the executable program configured, via the automated source code generator to report a pass or failure of the compiler based on the comparison between the expected outcome and the actual outcome.

15. The system of claim 14, wherein a difference between the expected outcome and the actual outcome indicates a failed parsing of the language syntax of the source code by the compiler.

16. The system of claim 14, wherein the executable program includes a plurality of comparisons between expected outcomes and actual outcomes each associated with a different type of program construct, wherein a mismatch between an expected outcome and an actual outcome indicates a failure associated with either the code generation or execution of the associated program construct.

17. A non-transitory and computer-readable storage medium comprising computer-executable instructions which, when executed, cause a computing system to perform a method of validating operation of a compiler, the method comprising:
receiving, by a translation tool, a user-readable syntax description in a text document;
translating, by the translation tool, the user-readable syntax description in the text document into a definition of language syntax;
receiving the definition of language syntax at an automated source code generator from the translation tool;
generating program code at the automated source code generator based on the received definition of language syntax, wherein the program code is represented in source code including constructed self-validating code and syntactically-correct automatically generated code, wherein the constructed self-validating code is programmed to test for validation of correct performance of the compiler relative to parsing syntax of the received definition of language syntax when the constructed self-validating code is compiled by the compiler; and
providing the source code to the compiler;
compiling, by the compiler, the source code into object code;
executing the self-validating code as the object code in a computing system such that the computing system outputs an indication of correctness of the compiler in parsing the language syntax of the source code and in generating and executing instructions corresponding to the source code; and
executing the syntactically-correct automatically generated code as the object code in the computing system and testing at least an operation of the compiler.

18. The computer-readable storage medium of claim 17, wherein the syntactically-correct automatically generated code comprises randomly generated language statements defined at least in part by the definition of the language syntax.

19. The computer-readable storage medium of claim 17, wherein the source code is constructed to require compilation via one or more of a plurality of compiler procedures.

20. The computer-readable storage medium of claim 17, wherein at least one of:
(a) the portion of the compiler is tested randomly, or
(b) the executing of the self-validating code and the executing of the syntactically-correct automatically generated code is concurrent.

* * * * *